United States Patent

[11] 3,580,989

[72] Inventor Thomas A. Banning, Jr.
Apt.1408, 5500-5520 S. Shore Drive, Chicago, Ill. 60637

[21] Appl. No. 645,843
[22] Filed May 19, 1967
[45] Patented May 25, 1971
Continuation-in-part of application Ser. No. 559,494, June 22, 1966, which is a continuation-in-part of application Ser. No. 490,402, Sept. 27, 1966, now Patent No. 3,478,162, which is a continuation-in-part of application Ser. No. 459,399, May 27, 1965, now Patent No. 3,365,542.

[54] SUBSCRIPTION TELEVISION SYSTEM UTILIZING A TRANSMISSION LINE FOR CONDUCTING EACH AESTHETIC QUALITY TELEVISION PROGRAM
13 Claims, 17 Drawing Figs.

[52] U.S. Cl. .................................................... 178/5.1
[51] Int. Cl. .................................................... H04n 1/32, H04n 1/34
[50] Field of Search .......................................... 178/5.1, 5.1 (CS), 5.1 (PDS)

[56] References Cited

UNITED STATES PATENTS

| | | | |
|---|---|---|---|
| 3,070,652 | 12/1962 | Banning, Jr. .................. | 178/5.1 |
| 3,104,280 | 9/1963 | Akrell .......................... | 178/5.1 |
| 3,157,737 | 11/1964 | Schlafly, Jr. .................. | 178/5.1X |
| 3,211,830 | 10/1965 | Sargent, Jr. .................... | 178/5.1X |
| 3,365,542 | 1/1968 | Banning, Jr. .................. | 178/5.1X |
| 3,387,083 | 6/1968 | Farber et al. ................. | 178/5.1X |

*Primary Examiner*—Rodney D. Bennett, Jr.
*Assistant Examiner*—Malcolm F. Hubler

ABSTRACT: A Subscription Television System, including simultaneous coaxial transmission of several different sending station programs through an attended control station, with switching apparatus at each subscription receiver enabling the control station attendant to deliver to the subscription receiver any subscriber-selected one of said programs in subscriber-selected aesthetic rendition quality, including inferior aesthetic quality without subscription charge, or a superior quality with subscription charge; including provisions assuring against fraudulent subscription-receiver program reception in superior instead of inferior quality rendition; and to assure subscriber-receiver reception of only the selected program, in the quality instructed to the attendant.

Patented May 25, 1971 | 3,580,989

4 Sheets-Sheet 1

Inventor: Thos. A. Banning Jr.
Thomas A. Banning, Jr.

Inventor:
Thomas A. Banning, Jr.
Thos. A. Banning Jr.

Inventor
Thomas A. Banning, Jr.

Inventor:
Thomas A. Banning, Jr.

SUBSCRIPTION TELEVISION SYSTEM UTILIZING A TRANSMISSION LINE FOR CONDUCTING EACH AESTHETIC QUALITY TELEVISION PROGRAM

This application is a continuation-in-part of my copending application for Improvements in Pay or Subscription Television, Radio, and the Like, Ser. No. 559,494, filed June 22nd, 1966 and still pending which application, Ser. No. 559,494 is a continuation-in-part of my application for Improvements in PrePay or Subscription Television, Ser. No. 490,402, filed Sept. 27th, 1966, now U.S. Pat. No. 3,478,162, and which application, Ser. No. 490,402 is a continuation-in-part of my application, Ser. No. 459,399, for Improvements in Subscription or Pay Television, and the Like, filed May 27th, 1965, and issued as Letters Patent No. 3,365,542, Jan. 23rd, 1968. The present application is a continuation-in-part of each of said earlier filed applications, Ser. Nos. 459,399 (U.S. Pat. No. 3,365,542), 490,402, and 559,494, and copending with each such case.

This invention relates to improvements in pay or subscription television, and the like. Specifically, the improvements herein disclosed have special application to that type of pay or subscription television, and the systems for practicing the same, in which provision is made for enabling delivery to viewers of television receivers, a stated program in either of two (or more) aesthetic qualities of translation, one such quality being of an inferior aesthetic value, and available to nonsubscribers, such as the public, using conventional receivers, without pay or subscription; and the other aesthetic quality being of superior aesthetic value, and available only to subscribers to the service, or by a prepay operation produced by the user of the receiver, at a local coin-box or the like.

The present applicant is the inventor of numerous embodiments of such system, and numerous forms of equipment and structures enabling the practice of the above outlined system of television operation, and is the inventor and owner of numerous patents and applications covering the same. One such basic form of operation and the equipment therefor, includes the provision of means to broadcast the inferior aesthetic quality signals, in form such as to be available to the nonsubscribers, using conventional receivers; with provisions for at the same time transmitting the program over nonaccessible lines, such as coaxial lines, the signals thus transmitted being receivable in conventional receivers, but translatable to produce the program in the superior aesthetic quality, only by prepay or subscription operation; and, when such superior aesthetic quality translation is a color translation, such reception being by use of a color TV receiver. Generally, or as a satisfactory form of the inferior aesthetic quality translation, the reception and translation of such quality would be in monochrome, instead of color. Various combinations of differing aesthetic quality renditions translations of the program, one being inferior to the other, are disclosed and covered by such patents and/or applications, already referred to. The structures and operations to be hereinafter disclosed, and the structures therefor, are specifically of the type for broadcasting the inferior quality signals in monochrome, and with the conventional "Commercials," if desired, being receivable by conventional receivers, without pay or subscription operations, according to conventional present practice; the superior aesthetic quality program signals, being transmitted by such coaxial or other nonaccessible carrier means, and the signals thus transmitted being such as may be translated either in monochrome, but without inclusion of the "Commercials," or translated in color, by use of a conventional color receiver also without Commercials; it being noted that under present Rules of the F.C.C., color receivers are capable of translating monochrome received signals, in monochrome; and the present disclosures also include means to receive and translate the broadcast signals of the inferior quality rendition of the program, including, in such case, the "Commercials" so broadcast. Thus three forms of translation are available, to subscribers to the present system and by use of the present disclosures, being, First, monochrome translation, including the "Commercials,"being the broadcast embodiment; Second, monochrome, without the "Commercials," being transmitted over a nonaccessible line; and Third, color, also without the "-Commercials," also being transmitted over a nonaccessible line. It will become apparent, however, that if desired, features of the present invention may be used without provision for all three such receptions, over the nonaccessible line.

Structures disclosing the foregoing features and capable of operating according to the operations already stated, are also included in my copending application for U.S. Patent on Improvements in Pay or Subscription Television, Radio, and the Like, Ser. No. 559,494, filed June 22nd, 1966, and still pending. The present application discloses various improvements usable in connection with such earlier disclosures, including the following:

In that earlier application I have disclosed means to transmit the superior aesthetic quality rendition signals (and, if desired, also the inferior aesthetic quality rendition signals) to the subscriber's or subscribers' receivers, over the coaxial line (or lines), from a single sending station, operating on its assigned RF channel, with provision at each receiver location, of a switching facility, constituted to switch the RF input of such receiver, normally to the antenna of such receiver, for reception of the broadcast signals of the program in question (as well as any other broadcast program then available and tunable by such receiver), such switching facility being shiftable in one direction for connection of the receiver to one of the coaxial lines (e.g., carrying the program in monochrome, without "Commercials"), or shiftable in the other direction for connection of the receiver to the other of the coaxial lines (e.g., carrying the program in color, also without "Commercials"). That application discloses means, under control of an attendant at a control station to effect switching to the one or the other direction, by a signal sent to the switching facility of the receiver in question, upon request of the user of such receiver; alternately, provision is made in that application, for control of such switching facility by the user of the receiver, by means of a coin box or the like.

An important objective of the present application, is to make provision for delivering to each subscriber's switching facility, two or more different programs, carried simultaneously on their respective channels, all such programs being pay or subscription programs, with choice available to the subscriber user of the receiver to select either the inferior or the superior rendition, according to the principles already explained. It is a further objective to make provision enabling the user to select that program of his choice from among the several programs available to subscribers as pay or subscription programs at the time in question, with provision of structure whereby the attendant at the control station shall deliver to such receiver, the program so selected, without interfering with the continued use by other subscribers, of the coaxial line carrying such program and other nonselected programs, at the time in question. Stated otherwise, two or more programs may be sent out over the same coaxial line into a neighborhood, during the same interval; and several or many subscribers may be connected to such coaxial line, through use of their respective switching facilities; and each of such subscribers, after notifying the attendant at such control station as to their respective program selections, may have such selected programs delivered or made accessible to them through proper settings of their respective receiver switching facilities. Specifically, when a subscriber has notified the attendant of his program choice, the attendant may then effect such operations, as shall make that program available to such subscriber, to the exclusion of the other subscription programs then being carried by such coaxial line, from availability by such subscriber. For example, assume that programs "A," "B" and "C," of their respective channel frequencies, are at the time connected to such coaxial line, and thus carried to the region of numerous subscribers, including a particular subscriber, such particular subscriber may advise the control station attendant that he desired to receive program "B," all three of the programs remaining available for delivery to other subscribers. The attendant will then execute simple connections at the control station, making program "B" available to such particular subscriber for the interval of such selected program. At the same time, other subscribers may select for their entertainment that same program, or any of the other programs then available over such coaxial line, each without interference with the perfection of delivery of the program so selected by him.

A further objective in this connection, is to make provision for such selective operations, and for the attendant's control response, under the condition that each subscriber, having made his selection of program, shall not be able to receive any other one of the subscription programs then available, except by proper readjustment of the facilities under the attendant's care. This structural provision will make it possible for the attendant or proper person at the control station, to record the program selection thus made by each individual subscriber, for the time in question, for matters of accountancy, and the like. Nevertheless, as will hereinafter appear, such subscriber may, at any time during progress of the selected program, abandon such choice, and by a simple switching operation, connect his receiver to its conventional antenna, for reception of any desired program then being broadcast. Alternatively, he may, during the progress of his originally selected program, request the attendant at the control station to make available to him another selected program then in progress as a pay or subscription program.

An important feature of the present invention resides in the provision of means, comprising a portion of the switching facility at the subscriber's receiver, for producing a record of which program of the several subscription programs currently available, he actually tuned and received; together with further provision in such switching facility, to prevent him from receiving any other subscription program than the program which he had previously selected to the attendant. By this arrangement, proper accountancy either at the control station or elsewhere may be assured, in cases where more than one program is available at a given time, and when the charges for such several programs are not the same. If, for example, the available programs at a stated time interval were, station "A," 0 $1.00, station "B," 0 $1.50, and station "C," 0 $2.50, the user of the receiver should not be able to request availability of "A" at its low cost, and, after the attendant had made proper switching operations at the control station, and then tune his receiver to, and receive "B" or "C," being of higher costs. This assurance is provided by the provision of means whereby only the program for which the attendant has made operation, may be received during the progress of such selected program, unless the user of such receiver instructs the attendant to make a change. Such change may be to another program of different rate charge, which fact may be recorded by the control station attendant.

Various other operational objectives are provided for in the structures hereinafter described. Additionally, further objectives of a structural nature, enabling use of a very simple control line arrangement between each subscriber switching facility, and the control station, are disclosed, including the following:

A control line or lines are extended from the control station to each subscriber receiver. Provision is made for control of the switching facility of such receiver, for connection of the RF input element of the receiver, to either a superior aesthetic quality rendition of the subscription program, or an inferior aesthetic quality rendition of such program, by simple reversal of the position of such switching facility. This is accomplished, in one embodiment, by reversal of the direction of current flow through the control line and through the switching facility, (being of polarized form). Such reversal of control current flow is produced by the connection of the control line to either a positive or a negative current supply terminal of a DC current source (such as a battery), of which the central point is grounded. Provision is then made for delivering to such control line a selected one of a plurality of control frequencies, imposed on the DC above referred to, each such control frequency corresponding to a specified one of the programs and channels of subscription television, being carried on the coaxial line. For example, in the illustrated embodiment three such control frequencies are available for supply to the control line, corresponding to three programs and channels being carried by the coaxial line. Such control frequency is delivered to the switching facility of the receiver in question; which receiver is provided with a number of frequency response units corresponding in number and frequency responses, to the frequency controls, and corresponding to the number of available program channel frequencies. The receiver switching facility is provided with a control frequency response element corresponding to each of the available control frequencies. Accordingly, only that frequency response element will respond whose control response frequency is resonant to that of a specified one of the available control frequencies. Each such response element is companion to a corresponding relay; accordingly, only that relay will be activated which corresponds to the control frequency applied to the control line at the control station, and corresponding to the selected program and channel therefor. Each such relay, when activated, produces a line connection to a contact of a selector switch on the receiver switching facility, each of the available program channels being represented by similar contacts of such switch. Accordingly, the switch being connected to the RF input element of the receiver, and the relays being provided with RF connections to the coaxial line, connection is established by such relay, for delivery of RF from the coaxial line to the RF input element of the receiver, when one of the response elements responds to a resonant control frequency delivered to the control line, at the control station. Each of the connections from a relay to the corresponding contact of such selector switch, includes a band pass frequency unit constituted to pass only the RF frequency band of the chosen channel. Accordingly, only the channel carrying the selected program is placed in connection with the receiver, providing also that the selector switch is set to the proper program (channel selected) position.

Accordingly, when the attendant at the control station produces operations to deliver the control frequency which corresponds to the selected program channel, to the control line of the receiver in question, only that program channel can be brought into operative connection with the coaxial line. This produces a protection against false tuning of the receiver to a nonselected channel, and false delivery of a nonselected program to such receiver. Turning the selector switch to a contact position other than the position corresponding to the selected channel and program will result in nondelivery of any program to the receiver.

A slide element is provided, preferably in the top position of the housing of the receiver switching facility, which slide unit is normally spring urged outward from its fully inserted position. Such slide unit may be completely removed from the switch housing, for which purpose it conveniently comprises a thin strip of plastic or the like, the edges of such strip being received in corresponding grooves of the housing top. Such slide carries a contact element on its lower surface, which, when the slide is fully inserted, establishes a portion of the circuitry essential to operativeness of the various switching and related operations. Accordingly, only when such slide is fully inserted into the housing can operational conditions be established. A stop element is provided which normally reaches into the path of insertion of such slide, to prevent the full insertion thereof needed for such operative condition. Only when the control line to such switching facility is electrified by the attendant at the control station, is such stop element withdrawn from its slide insertion interfering condition. Accordingly, the slide cannot be fully inserted except when the attendant has connected the control line of such receiver, to the proper source of potential. A latch element is provided for engagement of the slide to hold such slide in its fully inserted position, only when potential exists on the control line, as just above referred to. Thus, potential having been established on the control line by the purposeful operation of the attendant, the slide is released so that it can be fully inserted by the user of the receiver; and, being thus fully inserted, the latch will retain it in such position, against the urge of the spring, urging shift of the slide to its nonoperative position, with corresponding disablement of its circuitry, so that program reception can no longer be attained, until the slide is again fully inserted for a subsequent program reception.

The under face of the slide carries a crosswise extending area of "electrosensitive" coated material, being material which, when subjected to a sufficient difference of potential between its two surfaces, becomes darkened or otherwise defaced, only at the location of such potential difference. Provision is made in the form of a group of stylii extending up from the floor of the housing, to engage the downwardly facing bottom surface of such area of electrosensitive material, so that when the slide is delivered from its fully closed or inserted position at conclusion of a pay or subscription program, only that one of such stylii will be electrified to produce a darkened line or streak lengthwise of the slide during such delivery operation, which stylus corresponds to the program which was selected by the subscriber. There are provided three stylii (in the illustrated embodiment), extending up from the floor of the housing, to the under face of the slide, at locations successively across the width of the slide. Each such stylus is connected to the relay which corresponds to an identified one of the channels, so that only that stylus is electrified which corresponds to the selected program and TV channel.

At conclusion of a program the attendant will terminate the electrification of the control line, thus releasing the slide so that it will either be ejected by the spring, or may be fully withdrawn by the user of the receiver, for substitution of another slide when another program is to be received and recorded. Since the slides are thin, a considerable number of them may be stacked into a small bundle, for delivery monthly, periodically, to the subscriber, for use as a check against the billing of the operations company, for service. To this end each such slide may carry the date for its intended use.

The selector switch already referred to, includes, in addition to contacts for delivery of the several superior aesthetic quality programs, to the receiver, a further "Antenna" contact, which when contacted by the switch setting produces connection of the receiver, with an antenna, specifically, the antenna of such receiver. Accordingly, by setting the selector switch to such "Antenna" position, any broadcast program then available to the receiver, may be tuned and brought in. This operation may be performed regardless of the then setting produced by the attendant at the control station, or prior to such attendant's setting.

A further switch is provided on the switching facility which may be set to either of two positions. One such position corresponds to reception of the inferior aesthetic quality rendition of the program, and the other position corresponds to reception of the superior aesthetic quality rendition of such program. This switch is set to that quality rendition which the user of the receiver chooses to receive; and to which quality rendition the attendant must produce setting, in order to complete the series of connections needed for reception of the selected quality of rendition.

Various details of structure and possible operations, will appear from the detailed description of the invention, which consists in the features of construction and combinations of parts hereinafter described and claimed.

In the drawings:

FIG. 1 shows in outline, and schematically, one embodiment of my present invention, including three sending stations, each constituted to emit its program on its assigned RF channel, and in both an inferior aesthetic quality, and a superior aesthetic quality, and each such sending station being constituted to emit its inferior quality rendition by broadcast; also showing a typical control station, constituted to receive both qualities of rendition signals by nonaccessible transmission; from each of three sending stations, one of which is shown as a Comsat receiving and sending station, together with block showings of one receiver and its switching facility, and partial block showing of another receiver and its switching facility; together with nonaccessible transmission of both the inferior quality renditions and the superior quality renditions, to a location proximate to such receivers, such transmissions being by coaxial lines, and including, for each receiver to be served, two control lines, conveniently carried by such coaxial lines cable; the control station being provided with selector means under control of an attendant at the control station, such selector means constituted to deliver control signals to the control lines of each connected receiver, to enable the attendant to cause such connected receiver to receive the program rendition in that quality desired by the user of such receiver; and provision of the receiver switching facility for each receiver, constituted to enable production of the various operations already outlined herein;

FIG. 3 shows a diagrammatic plan view of the switching facility, the top of such facility being removed; this figure showing by blocks the convenient locations of the various response units, the corresponding relays, the polar relay and switching unit, the band pass filters, and the selector and other switch units already referred to;

Figure 1:
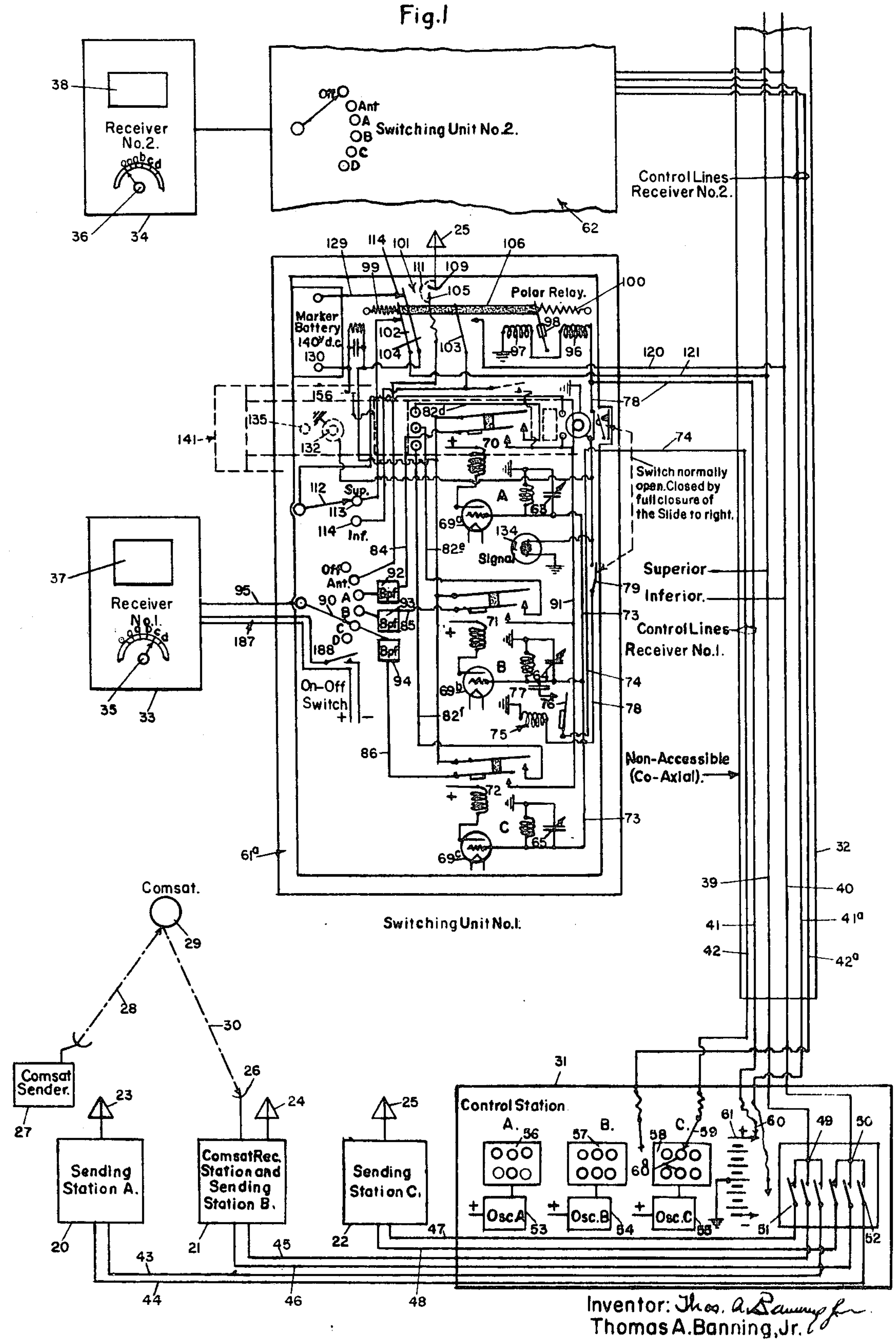
Figures 15, 16:
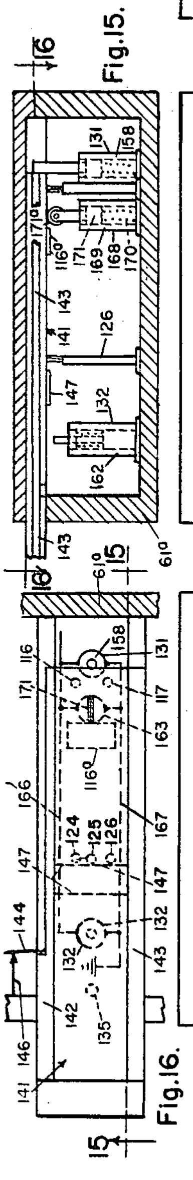
Figure 2:
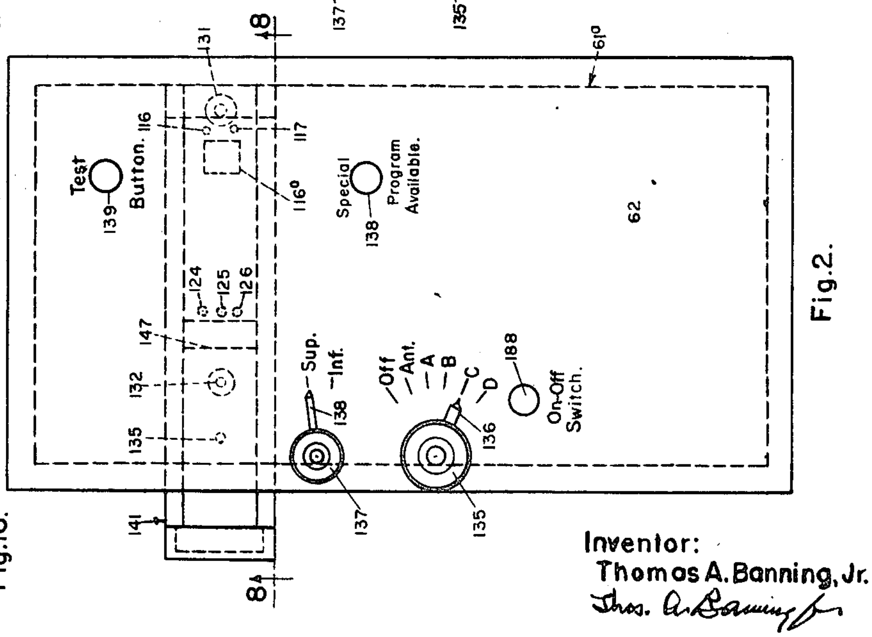
FIG. 2 shows a top plan view of one of the switching facility units for a receiver, the slide being partially but not completely inserted into the housing of the switching facility.
Figures 5, 6, 7, 8, 9, 10, 11, 12, 13, 14:
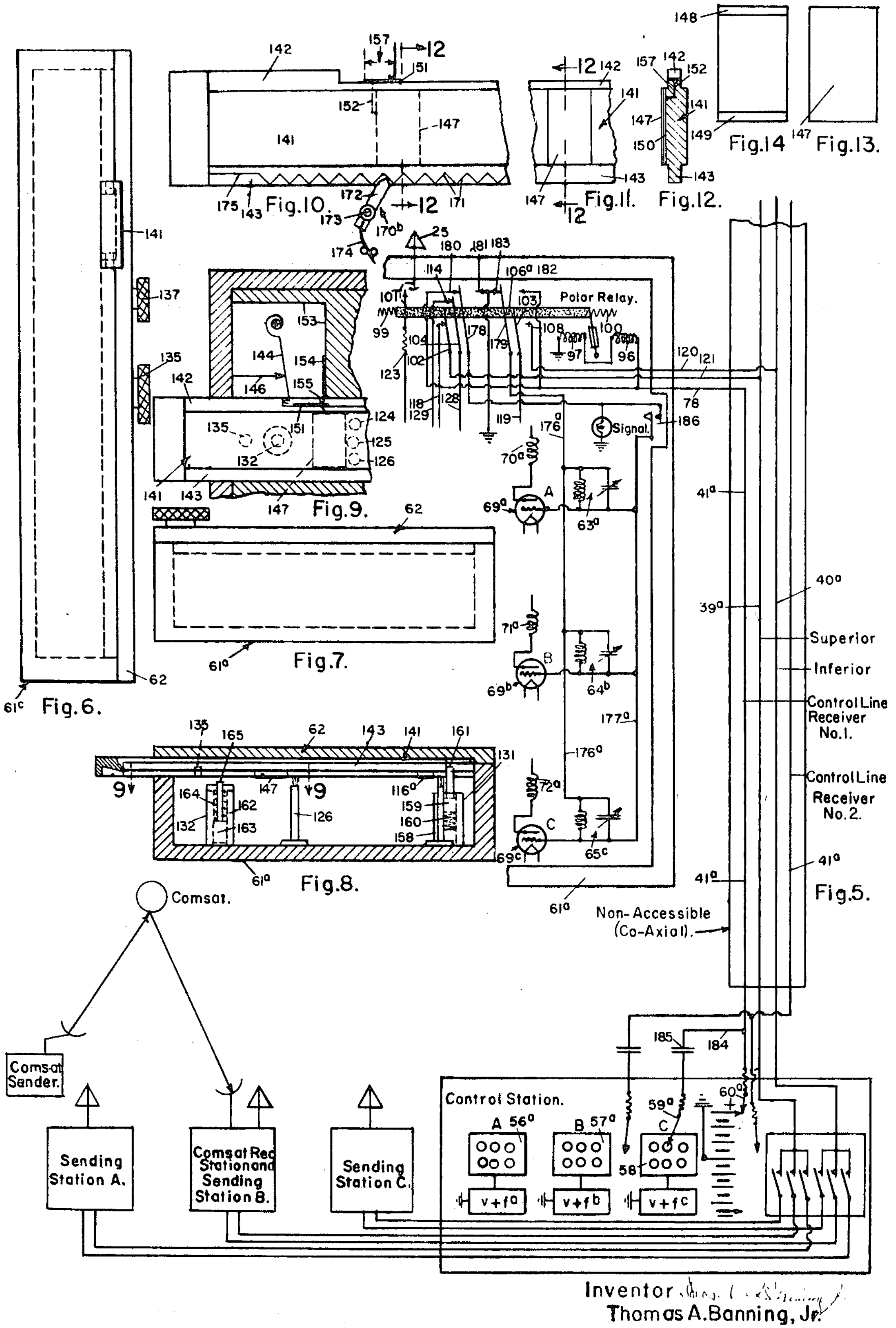
FIG. 5 shows a portion of a modified schematic showing, compared to the showing of FIG. 1; such modification residing in the fact that only a single control line is needed between the control station, and each of the served receivers, instead of two control lines as shown in FIG. 1.
FIG. 6 shows an edge view of the switching facility for a receiver.
FIG. 7 shows a front end view corresponding to FIG. 6.
FIG. 8 shows a cross section taken on the line 8–8 of FIG. 2, looking in the direction of the arrows.
FIG. 9 shows a fragmentary horizontal section taken on the line 9–9 of FIG. 8, looking downwardly.
FIG. 10 shows in plan view the left-hand end portion of the slide, the full-stroke unit being shown in its relation to such slide; with such full-stroke unit in position permitting slide movement only in the closing direction until the full closure has been completed.
FIG. 11 shows a fragmentary view of the bottom of the slide, at the location of the electrosensitive surface.
FIG. 12 is a cross section through the slide, taken on the lines 12–12 of FIGS. 10 and 11, looking in the directions of the arrows.
FIG. 13 is a bottom face view of the electrosensitive area attached to the slide.
FIG. 14 is a top face view of the element shown in FIG. 13, comprising the electrosensitive sheet which is attached to the bottom face of the slide.
Figure 17:
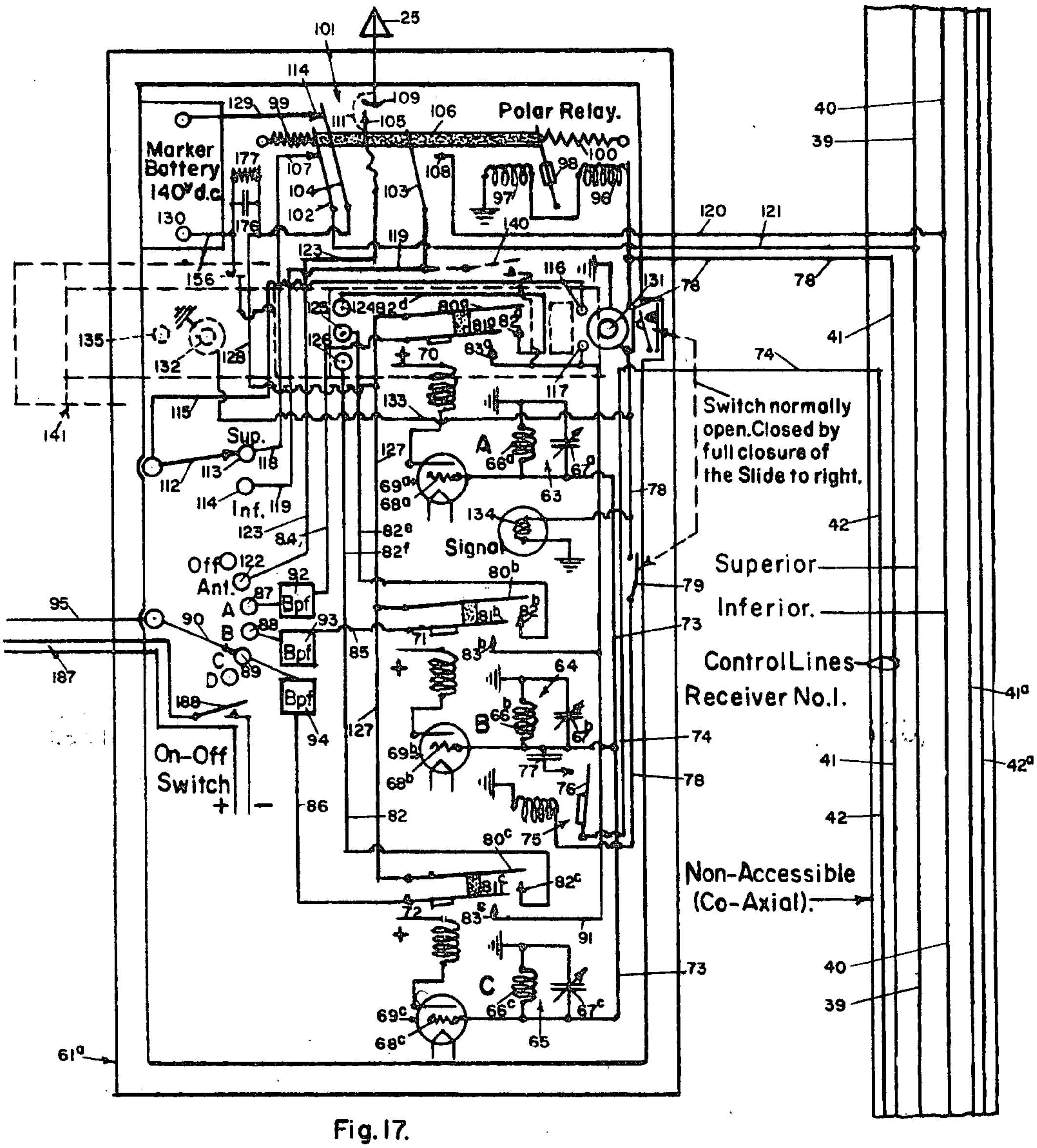

FIG. 15 is a cross section through an embodiment of the slide and related parts of the switching facility, taken on the line 8–8 of FIG. 2, but showing additional features which are not shown in FIG. 8, comprising means under control of the operations to sever the conducting element which is carried by the slide, producing such severing action during the first portion of a release operation of the slide after completion of a program, thus making such slide useless for reception of a successive program, and making it necessary to use a fresh slide to produce reception of such successor program;

FIG. 16 is a plan view of the slide, partially inserted to the stopping position imposed prior to the electrification of the control line by operation of the attendant at the control station, showing the additional feature of the cutter which severs the conducting unit carried by the slide, when the cutter is raised by termination of the control signal, allowing the spring of such cutter element to raise the cutter to elevation where it will cut such conducting unit on the slide, during removal of the slide, produced by the retracting spring acting on the slide; and FIG. 17 shows, on enlarged scale, the receiver-switching unit facility shown in FIG. 1, and the proximate section of the coaxial cable serving such receiver-switching unit.

Referring first to FIG. 1, I have herein shown the three sending stations "A," "B" and "C," each of which is provided with means constituted to produce and emit the program in two sets of signals, which when received and translated by suitable structures, produce fully intelligible renditions of such program in either of said two aesthetic qualities selectively. Various such structures are disclosed by me in issued U.S. patents, and pending applications for patents. Examples of such plural aesthetic quality renditions are Monochrome TV (inferior), Color TV (superior), with "Commercials" (inferior), without "Commercials"(superior), Negative picture translation (inferior), Positive picture translation (superior), Wrong color translation of color TV (inferior), Correct color translation (superior), Two Dimensional picture translation (inferior), Three Dimensional picture translation (superior), Monosonic Radio (sound) translation (inferior), Stereo sonic Radio (sound) translation, (superior), and others. In the present application I shall refer to Monochrome and Color rendition translations of the TV by way of example, but without intention to limit myself to such differentiation or to such two aesthetic qualities of rendition, except as may be needed by the very nature of special structures, or in the claims to follow. In FIG. 1 and elsewhere herein I have referred to monochrome translations or renditions, and color translations or renditions; but when I refer to "inferior" and "superior" qualities of such translations or renditions, such reference is without intention of limitation, except as stated above.

Each of such sending stations 20, 21 and 22, includes provision for broadcasting the inferior quality signals, by the antennas 23, 24 and 25. It is assumed that each such sending station produces its signals on its assigned radio frequency channel, so that two or more such sending stations may be emitting their selected programs on their assigned channels simultaneously, for reception and translation simultaneously, by different receivers, according to conventional practice. It is also assumed that each receiver, either in the hands of a nonsubscriber or a subscriber to the Pay-TV service herein disclosed, is constituted for tuning reception of any selected channel presently available in the area of such receiver. Accordingly, when each of such stations "A," "B" and "C" is broadcasting a program (either TV, including the customary audio, or Radio audio alone), such program may be tuned and received in its inferior quality rendition, by any member of the public having a conventional TV (or Radio) receiver, constituted to receive such program in the inferior quality under which it is being emitted. It is noted that the sending station "B" as illustrated is provided with means 26, constituted to receive signals emitted by "Comsat" operation, by the sending station 27, and beam 28, to the Comsat reflector 29, by which such signals are reflected over the beam 30, and picked up by such unit 26. Accordingly, such station "B" constitutes, when operating by use of such received Comsat signals, as a relay station, constituted to receive the Comsat signals, and to process them and emit them, so processed, either or both, according to the inferior quality or the superior quality rendition, with such inferior quality signals broadcast by the antenna 24 of such station "B." The details of such structures constitute no portion of the present invention, except insofar as such station is provided with means to produce and emit the program signals in either or both quality forms, for further processing according to the disclosures of the present invention.

A number of control stations may be distributed over a populated area, such as a large city; and provisions are made for transmitting to each such control station, both the monochrome signals and the color signals, for distribution of such signals into areas of some considerable subscriber population; with further distribution into smaller subareas of each such just defined areas. Individual subscribers will then be connected to the coaxial lines which reach to locations most convenient and close to such subscriber locations. For purposes of simplicity of illustration and description, I have, in FIG. 1 shown only one such control station, identified by the dashed enclosure, 31. The coaxial cable 32 extends from such control station into an area including the two receivers 33 and 34, it being assumed that such receivers are relatively close together so that they may be conveniently and economically connected to such cable 32, and served therefrom. Each such receiver is of conventional form; and for purposes of illustration only, it will be assumed that each receiver is a conventional TV receiver, constituted to tune and receive and translate the programs on all of the channels of sending stations "A," "B" and "C." Thus, each receiver includes the tuning of channel selecting unit, 35 or 36, together with the conventional viewing screen, 37 or 38.

The coaxial cable illustrated is provided with two coaxial lines 39 and 40, and for purposes of illustration simplicity, each such line is shown as a single conductor of coaxial type, and of conventional form and characteristics. In the embodiment of FIG. 1, now being described, I have provided two control lines 41 and 42 (and 41″ and 42″) for each of the subscriber receivers, served by such coaxial lines. The coaxial lines may run much beyond the locations of such receivers 33 and 34; and any other receivers to be served by such lines will each be provided with its control lines extending from the control station to the locality of such receiver, and properly connected to such receiver, through the instrumentalities hereinafter disclosed. It will be noted that in FIG. 1 the control lines 41 and 42 serve the receiver 33, and the control lines 41″ and 42″ serve the receiver 34. All such control lines extend into the control station, as shown in said figure.

There are extended from each of the sending stations "A," "B" and "C," coaxial lines (nonaccessible lines), to the control station; and for simplicity, each of these lines is shown in the form of a single conductor, corresponding in this respect, to the showing of the coaxial lines in the cable 32. Thus the lines 43 and 44 extend from the station "A," the lines 45 and 46 extend from the station "B" and the lines 47 and 48 extend from the station "C," all such lines terminating in the control station being now considered. Similar lines, or extensions of one or more of the herein illustrated lines, extend to such other control stations as may be connected to the network. As illustrated, the lines 43, 45 and 47 carry the superior quality signals from the respective sending stations to the control station; and the lines 44, 46 and 48 carry the inferior quality signals from the respective sending stations, to such control station. At the control station (or some other convenient location) all of the superior quality lines 43, 45 and 47, are brought together as shown at 49, and all of the inferior quality lines 44, 46 and 48, are brought together as shown at 50, the lines 39 and 40 of the coaxial cable, being connected to such junction points 49 and 50, respectively; Thus, the program channels of all three of the sending stations, are supplied to such coaxial cable lines, for both the superior quality renditions, and for the inferior quality renditions. The switching facilities shown at 51 and 52, are provided for such connecting and disconnecting operations of the individual sending station coaxial lines, as may be desired, according to good practice.

Provision is made at the control station, whereby the attendant may deliver potential to one of the control lines, 41, of either polarity. The switching facility of each receiver, presently to be described in detail, includes a polar relay constituted to normally stand in a central position when its magnetizing coils are nonelectrified; and to shift its movable contacts in one direction when the polar relay is electrified by DC of one polarity, and to shift in the opposite direction when the polar relay is electrified by DC of the opposite polarity. In one embodiment, when such polar relay is nonelectrified, and is in its central position, it connects the RF input of the receiver, with the antenna of such receiver, for reception of broadcast programs, then available on the air.

Means is next provided for permitting delivery, from the coaxial line of the cable, to the RF input of the receiver, only that RF channel which carries the selected program, and for denying access of all other RF channels to such receiver RF input during the program progress, or until such program delivery is purposefully terminated. Such means includes the following instrumentalities:

Provision is made at the control station for delivery of a plurality of control frequencies at least equal in number, to the number of programs to be carried by the coaxial line, each such control frequency corresponding to a specified RF channel and program. In the illustrated embodiment of FIG. 1 provision is made for three RF channels and programs; corresponding thereto are the three sources of specified control frequency, 53, 54 and 55, produced by the oscillators shown in the corresponding boxes. Each of these oscillators delivers its control frequency to a plug-in plate 56, 57 or 58, as the case may be. These oscillators are legended as "A," "B" and "C," respectively, corresponding to plug-in for the like programs, from the like legended sending stations. The control line 42 is provided with a plug 59 which can be inserted into one of the sockets 60 of that socket plate which corresponds to the selected program. Accordingly, during the interval of such insertion the control line 42 will carry that control frequency corresponding to the control of the selected program. Control frequencies may be of values, preferably within the supersonic range, as for example, 45,000/c.p.s., 50,000/c.p.s., and 55,000/c.p.s., corresponding to control for programs "A," "B," and "C," respectively. The control station also includes means to provide DC for delivery to the control line 41, of either polarity as selected, according to the operations, presently to be explained. For these purposes the control line 41 is provided with a plug 60 which may be inserted into either of two sockets at the ends of a battery 61, the center of such battery being grounded. Accordingly, when such plug is inserted into the end of the battery identified +, the control line will be retained at corresponding potential above ground; when the plug is inserted into the socket at the other end of the battery, the control line will be retained at corresponding potential below ground. Proper provision is made for response of the polar relay to either of such potential conditions.

The switching facility for the receiver in question is provided with three response units, each tuned to respond only at the impressed frequency of one of the control frequencies carried by the control line. Accordingly, by applying a connection of all such response elements, to such frequency control line, only that response element will respond of which the resonant frequency matches the control frequency which the attendant at the control station has applied to such frequency control line. All of the other response units will remain "-dead," unresponsive to such particular control frequency, corresponding to the desired program. A response relay is provided corresponding to each such response unit. One of the output contacts of each such relay is connected to a stationary contact of a selector switch, which selector switch comprises a portion of the switching facility. Such relay output contact, when thus engaged by response of the corresponding response element, provides an RF line from the RF connection deriving RF from the coaxial line of the cable. A Band Pass Filter is placed in each such line from a relay to the corresponding stationary contact of the selector switch; and each such B.P.F. if tuned to pass only the RF channel of the program for which the attendant has plugged the control frequency control line to the frequency corresponding to such RF channel. Accordingly, although all of the RF channels for all of the programs being carried by the line of the coaxial cable, is delivered by the activation of the response unit relay in question, only that RF channel which is desired can reach the stationary contact of the selector switch, when such switch is set to such stationary contact.

Each of the stationary contacts of such selector switch corresponds to a setting of the receiver channel control element, to a specified channel, for translation of the corresponding program. The movable contact of such selector switch is connected to the RF input element of the receiver. Accordingly, when the selector switch is set to that stationary contact which corresponds to the selected program, such program is received, and all other programs then being carried by the line of the coaxial cable, are, for the time being, precluded from reception and translation by such receiver. Should the user of such receiver tune the station tuner of such receiver, to some program other than that for which the attendant had set the control frequency plug-in, such receiver would remain dead, not receiving any program. Also, should the user of such receiver and its switching facility, set the selector switch of such facility, to some RF channel position, other than that for which the attendant had made plug-in, the receiver would remain dead; since under such conditions, the response unit for such other control frequency, would not respond, such other control frequency being then absent from the control line.

Figure 4:
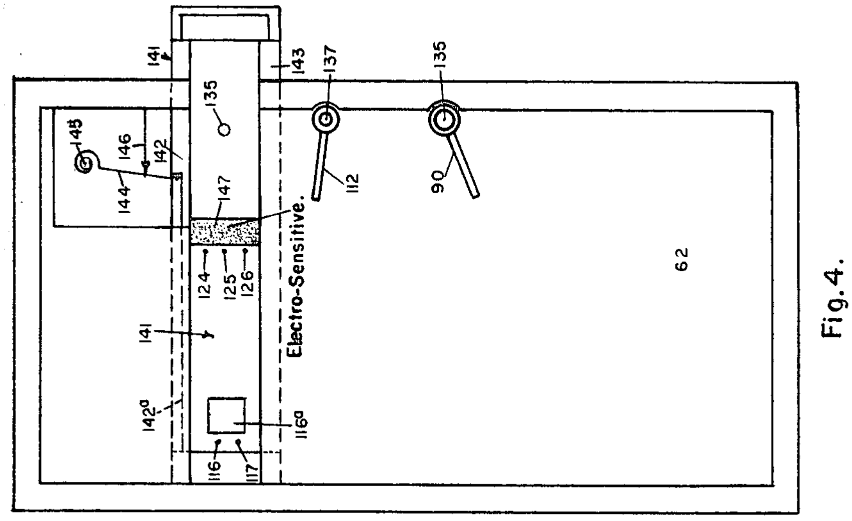
FIG. 4 shows a bottom face view of the top or cover plate of the switching facility enclosure; the slide being only partly inserted; and this figure shows the electrosensitive surfacing on the bottom of such slide, and the circuit closure portion which serves, when the slide is completely inserted, to complete certain circuits to render the operations possible.

Reference is next made again to FIGS. 1 and 17, wherein the structures are detailed as follows:

The switching facility for the receiver is conveniently housed with a rectangular box, with a removable, but locked cover, such box and cover being shown at 61[a] and 62, (the cover being shown in FIGS. 2 and 4, and elsewhere). The three response units 63, 64 and 65 are set on the floor of the box; and for purposes of simplicity in illustration, each such response unit includes the fixed inductance 66 and the shop adjustable capacitance 67, one end of such pair being grounded, and the other end being connected to the grid 68 of a tube 69. Such elements carry like numerals for the three units, but with the suffixes "a," "b" and "C," for the units which serve programs from the sending stations "A," "B" and "C," respectively. The relays 70, 71 and 72 are provided for such response elements; the solenoid of each such relay being connected to the plate of the corresponding tube, and the free end of the solenoid being grounded (connected to a return line). Accordingly, whenever a frequency is impressed across all three of the response elements, which frequency matches only one of the response frequencies of such response elements, only such matching response element will respond, and the potential of its free end (connected to the corresponding grid) will rise, thus making the corresponding tube conducting, and activating only the corresponding relay. One side of each of the response elements is connected to the line 73. The line 74 extends from connection with the control frequency line 42 carried by the coaxial cable, and brought to the location of the switching facility in question. The line 78 is brought to a relay 75, connecting to the solenoid of such relay, the other end of such solenoid being grounded. Activation of such relay causes its movable contact 76 to establish connection of the line 74 with the line 73 through the capacitor 77. Such line 78 connects from the control line 41 carried by the coaxial cable, which control line 41 is electrified either positive or negative by the control station attendant, as already explained. Accordingly, when such control line 41 is electrified either positive or negative, the relay 75 will respond, to connect the three response elements to the control frequency line 42, through the medium of the relay 75; but it is now noted that a switch 79 is included in such line 78 at a point such that when such switch is open delivery of current to the line 78 above the location of such relay 75 is interrupted, thus preventing the aforesaid activation of the response elements, until such switch is purposefully closed. Although such switch is shown at a location on FIG. 1, below the location of the slide, presently to be described, such switch is actually located in or on the wall of the boxlike housing in position to be closed by the slide, only when such slide is fully inserted to its working position, as will be hereinafter explained more fully.

Each of the relays 70, 71 and 72 is provided with two movable contacts, engageable with corresponding stationary contacts, each such relay being normally open. These are the movable contacts 80 and 81, for each relay (suffixed "a," "b" and "c," corresponding to the nomenclature already defined). The stationary contacts corresponding to such movable contacts are shown at 82 and 83 for the three relays, again with proper suffixes to define the corresponding programs and program signals. The tongues 81$^a$, 81$^b$ and 81$^c$ connect over the lines 84, 85 and 86, respectively, with corresponding stationary contacts 87, 88 and 89 of the selector switch 90, conveniently mounted on the top section of the switching facility housing. The stationary contacts 83$^a$, 83$^b$ and 83$^c$, which correspond to such movable contacts or tongues 81$^a$, 81$^b$ and 81$^c$, all connect to the line 91 which line 91 will be connected to the coaxial cable line 39 for program signals of the superior quality rendition, such connection to such line 39 being effected under various controls, presently to be explained. Accordingly, when such line 91 is so connected to such coaxial line 39, the closing of any one of the relays, by control frequency response of the corresponding response unit, will cause to be delivered by the movable contact 81$^a$, 81$^b$ or 81$^c$, as the case may be, to the corresponding line 84, 85 or 86, all of the RF channels being carried by such coaxial line at the time, being in the present case, three such channels, "A," "B" and "C." However, there is included in each such line 84, 85 or 86, a band-pass filter calibrated to pass only the particular channel band frequency of the channel which corresponds to such line 84, 85 or 86, and to its stationary contact 87, 88 or 89. These band-pass filters are shown at 92, 93 and 94, respectively. The switch 90 connects by the line 95 to the RF input connection of the receiver.

Accordingly, it is evident that only the RF channel carrying the selected pay or subscription program, can reach the subscriber's receiver RF input; and that the structures thus far disclosed, require that the control station attendant shall make insertion of the plug 59 (of the control frequency line 42) into that socket plate 58 which delivers the control frequency corresponding to the selected program (being program "C" with the plug 59 inserted into the socket plate 58); under which attendant produced condition, the user of the receiver can not receive any pay or subscription program, except such program "C." Moving the switch 90 to any other contact position (for a pay or subscription program) will simply reach a dead contact.

The operations above-described have been produced on the assumption that the control station attendant has plugged in the plug 60 of the control line 41 to that end of the battery 61 which will cause the polar relay to set its switch to position for delivery of the superior aesthetic quality renditions of the programs to the line 91. We next describe the structure of such polar relay and switching unit, as follows:

The polar relay includes the coils 96 and 97 connected in series, and acting on the magnetic armature 98. Accordingly, such armature will be set to the right or to the left of its central position depending on the direction of current flow through said coils 96 and 97. One end of the control line 41 is connected to one end of such pair of coils, and the other end of such pair of coils is grounded, as shown in FIG. 1. The armature is shown in FIG. 1 as shifted leftwardly, to its superior aesthetic quality position, the springs 99 and 100 act in opposition on such armature to urge the armature to its central position. Such polar relay is connected to the switch unit 101, carrying the two tongues 102 and 103, for superior quality reception and for inferior quality reception, respectively. A further tongue 104 is also provided for purposes presently to be disclosed; and a central contact 105 may also be provided. All such tongues are served by the armature of the polar relay by an insulating rod 106 connected to the polar relay armature. Stationary contacts 107 and 108 are provided corresponding to the tongues 102 and 103, respectively; and, if desired, a stationary contact 109 may be provided in position for engagement by the central contact 105, which contact 109 connects to the antenna of the receiver in question, for provision of broadcast programs to such receiver, whenever neither of the control lines 41 and 42 is electrified. The stationary contact 114 is provided for engagement by the tongue 104 when the polar relay is set over to its superior quality position, as illustrated. If desired the stationary antenna contact 109 may be permanently connected to the tongue or contact 105, as shown by the dotted line 111 in FIGS. 1 and 17.

I have provided, conveniently on the top portion of the switching facility, a "Superior or Inferior" switch 112, having the two contacts 113 and 114 for superior rendition, and for inferior rendition, respectively. The arm of this switch connects by a line 115 to a contact 116 proximate to the slide element; and a companion contact 117 connects to the line 91 already referred to. The arrangement is such that when the slide is fully inserted or projected into the top of the enclosure of the switching facility, such contacts 116 and 117 are connected together, thus establishing connection from the switch arm 112. By setting this arm to either the "Superior" position or the "Inferior" position, the rendition of corresponding quality will be made available, provided the control station attendant has plugged in the plug 60 to the proper end of the battery 61. These operations are possible since the "Superior" contact 113 is connected to the stationary contact 107 of the relay operated switch, by the line 118, and the "Inferior" contact 114 is connected to the tongue 103 of the relay operated switch, by the line 119, the contact 108 being connected to the inferior quality coaxial line 40 of the cable, by the line 120, and the tongue 102 being connected to the superior quality coaxial line 39 by the line 121. The contact 105 is connected to the stationary contact 122 of the selector switch 90 by the line 123. Accordingly, when such selector switch is set to such contact 122, broadcast reception from the receiver's antenna, may be secured, regardless of any operations of the attendant at the control station.

Mention has been made of the fact that provision is included in the switching facility, for producing a record of which one of several pay-programs being delivered at a given time, has been tuned and received by the user of the pay-subscriber receiver in question. In FIG. 1 there are shown three stylii extending up from the floor of the switching facility housing. These are identified as 124, 125 and 126, respectively. Each of the relays 70, 71 and 72 includes a second movable tongue contact already identified as 80 (with suffix "a," "b" or "c"), such movable contacts engaging corresponding stationary contacts 82 (with suffixes) when the respective relays are activated. All of the tongues 80 of such relays are connected by the lines 127 and 128, with the tongue 104 of the polar relay operated switch. The stationary contact 114 is engaged by such tongue when the polar relay is shifted to its superior quality position, by proper operation of the control station attendant. Such stationary contact 114 contacts by the line 129 to a DC source of potential 130, legended "Marker Battery" in FIGS. 1 and 17. The lines 82$^d$, 82$^e$ and 82$^f$ connect the contacts 82$^a$, 82$^b$ and 82$^c$, to the respective stylii 124, 125 and 126. Accordingly, that one of such stylii will be electrified by such DC potential, which stylus corresponds to the relay 70, 71 or 72 then being activated. Such stylii extend upwardly just far enough to wipe against the under surface of the area of the electrosensitive material carried by the slide, as the slide is shifted to its open position from its previous fully closed position, as produced by the operations presently to be disclosed. At this time it is stated that provision is also made for connection of the opposite polarity of such DC source, to the face of the electrosensitive area opposite to the face wiped by the stylus, being actually the upper face of such area which is in contact with the bottom surface of the slide proper. Thus the opposite faces of such electrosensitive element are subjected to the opposite DC potentials provided by the source 130, at the location of the electrified stylus.

Provision is made for arresting the movement of the slide, during its insertion into the top portion of the enclosure, prior to full insertion, and for removing such arresting movement when the selected quality control line 41 is electrified by the control station attendant. Such arresting movement element is shown at 131; and its structure will be detailed hereinafter. It is however noted that such arresting operation is produced by the normal projection of a pin upwardly by spring urge, to the arresting position, with retraction of such pin downward by current supplied by the control line 41 during electrification of such line, as above explained. Accordingly, the operation of the attendant, connecting the plug 60 to either end of the battery 61, at once permits the user of the switching facility, to close the slide to its full position. Afterwards, when the control station attendant withdraws the plug 60 from a battery terminal, such pin lowered position will be terminated, allowing the pin to be raised by its spring urge, into engagement with the under surface of the slide, so that, as the slide is withdrawn, the implement pin will snap up into interfering position, as the end of the slide passes such pin, and a reentry of the slide to its fully closed position will be prevented until the control line 41 may be again electrified.

Provision is made for preventing the slide from being withdrawn from its fully closed position, after it has been moved to such position; such withdrawal prevention being provided by a unit 132 set onto the floor of the switching facility enclosure, as indicated at such 132 in FIGS. 1 and 17. This unit 132 includes a vertically shiftable pin, urged down by spring pressure, but with provision for driving such pin upwardly when the control line 41 is electrified by the control station attendant. Such provision includes the line 133 connected to the line 78 (and thus to the control line 41), such connection being established above the switch 79, so that current is supplied to such unit 132, urging upward shift of the pin into engagement with the under surface of the slide as soon as such control line is electrified by the control station attendant. Then, since the blocking pin of the unit 131 has been lowered, permitting full closure of the slide, as such slide is brought to its fully closed position, the pin of the unit 132 will be snapped up into an opening 135 in the underface of the slide, thus locking the slide in its fully inserted position. This condition will continue as long as current potential continues on such control line 41. When the attendant withdraws the plug 60 from the battery, such unit 132 will be deelectrified, allowing its pin to be lowered under spring urge. This will permit withdrawal of the slide, or projection thereof in the withdrawal direction.

In addition to the facilities just above described, for preventing full insertion of the slide prior to electrification of the control line 41, and for preventing withdrawal of the slide after it has been fully inserted, and during the continuation of electrification of such control line 41, I have made further provision for severing the conducting area 116, which is carried by the lower face of the slide, such severing operation occuring during the early portion of the withdrawal of the slide, or its ejection by spring operation, as presently to be disclosed. Such severing operation is produced by a unit set close to the unit 131 shown in FIG. 1; but such additional severing unit is not shown in FIG. 1, due to lack of space; but such unit is shown in FIGS. hereinafter to be described.

I have provided a signal lamp 134, set within the switching facility enclosure at a convenient location, and visible through a window of the top of such enclosure. This lamp is connected to the line 78 at a position above the switch 79 already referred to. Accordingly, such lamp will be illuminated whenever the control line 41 is electrified by the control station attendant, and even prior to full insertion of the slide to its fully closed position. Accordingly, the user of the switching facility will be informed as soon as the attendant has made proper insertion of the plug 60 into either end of the battery, that the facilities have now been conditioned to the point at which reception of the desired program may be obtained, either as a superior quality rendition, or as an inferior quality rendition, depending on which end of the battery has received such plug 60.

Figure 3:
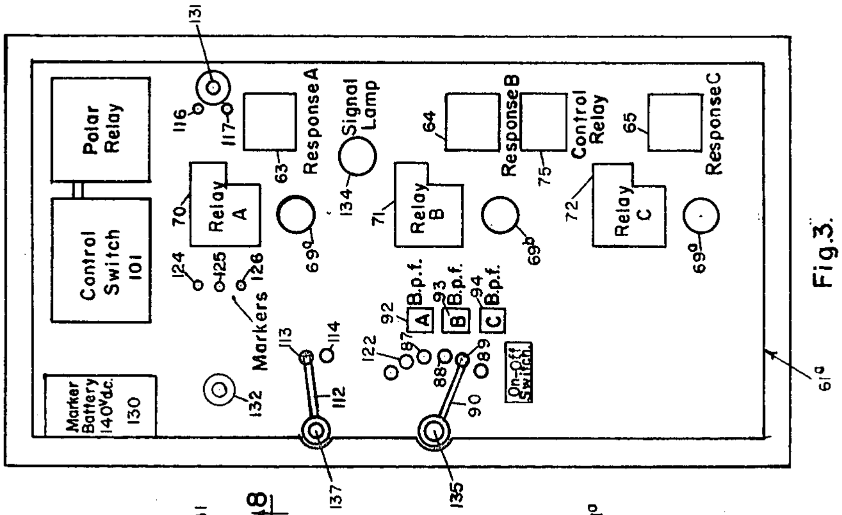

Reference is next made to FIGS. 2, 3 and 4, showing in further detail various features of structure. The selector switch is provided with the conventional button 135 and pointer 136, referring to the channel designations "A," "B" and "C," and the unmarked unoccupied position "D," together with the "Antenna" position and "Off." The button is carried by a stub shaft extending through the cover of the switching facility enclosure, where such shaft carries the movable contact arm 90, already referred to. The button 137 carries the switching unit 112, already referred to, being connected thereto by the stub shaft extending through the cover of the switching facility enclosure. The pointer 138 refers to the indicia "Sup." and "Inf.," corresponding to the contacts 113 and 114, which are selectively engaged by the contact arm 112. The opening 138, vertically aligned with the signal lamp 134, displays such signal lamp when lighted. I have already noted that such signal lamp becomes and remains lighted during the entire interval of plugging-in the plug 60 with either end of the battery.

The switch button legended "Test Button," 139, which conveniently takes the form of a push button, remaining in closed switch position only as long as it is pressed down, may be used for a special operation, as follows: if the attendant should plug the plug 60 into that end of the battery to produce connection to the inferior quality rendition, and the user of the receiver should, after seeing such inferior quality rendition, decide to have the rendition changed to the superior quality rendition, such change could only be made by operations of the attendant, comprising removing the plug 60 from the battery end to which it had been plugged, and replugging it to the other end of the battery, after waiting a short interval to allow the slide to be released, and shifted outwardly far enough to enable a fresh start to be made. These operations may be eliminated by use of the pushbutton arrangement, 139, as follows:

The user may signal the attendant to plug-in for delivery of the inferior quality rendition; after which the user may defer setting the slide fully to its closed positions, thus also leaving the contacts 116 and 117 unbridged or unconnected together. Then such user may depress the button 139; thus closing the switch 140. Such switch is bridged across the contacts 116 and 117; thus such bridging serves to make the various circuits operable which require use to enable the user to obtain production of the program which he has requested to the attendant, and on the further assumption that the switch unit 137 (112) has been set to the inferior quality reception position. The user may thus see the program for as long as he may retain the button depressed, to enable him to either shift the slide to its fully closed position, for reception of the entire program in its inferior quality; or he may decide to signal the attendant that he desires the program delivered in its superior quality of reception and rendition. Having done this such attendant has only to shift the plug 60 from its inferior quality position, to its superior quality position whereupon the user of the receiver may set the slide to its fully inserted position, where it will be locked, and will remain until the attendant unplugs the plug 60 at the termination of the program; it being understood, also, that the user will reset or set the switch unit 137 to its "Sup." position, to correspond to the resetting operation of the plug 60, produced by the attendant.

Reference has been made to the area of electrosensitive material which wipes across the upper ends of the stylii 124, 125 and 126, which stylii are electrified selectively according to which of the relays 70, 71 or 72 is activated, corresponding to the response of one of the control frequency response units 63, 64 or 65. Such a material (electrosensitive) is disclosed in the Bulletin of The Western Union Telegraph Company, dated May 1, 1950, under the heading of "Western Union 'Teledeltos' Recording paper" "General Information" and in a reprint from "Western Union Electrical Review" carrying the article by Grosvenor Hotchkiss titled "Electrosensitive Recording Paper for Facsimile Telegraph Apparatus and Graphic Chart Instruments," such reprint being dated 2/1/49. Such electrosensitive paper comprises, basically an electrically conductive paper thinly coated with opaque material which provides a light gray surface that instantaneously becomes black at any point where at electric current passes through the composite sheet. Such sheet comprises the electrically conductive paper, coated on one surface with the electrically sensitive coating, and coated on its opposite surface with a thin sheet or film of aluminum or other conducting material. The voltage (DC) to be applied between the two outer surfaces of such composite sheet, depends on the overall thickness of the composite; e.g. thickness of substantially 0.0032 inch (3 2/10 mils), which readily takes recordings when the voltage between the two surfaces is of the order of 30—50$^{v.}$ when the rate of travel is 140 inches/minute; or 70—100$^{v.}$ when the rate of travel is 700 inches/minute; or 80—115$^{v.}$ when the rate of travel is 1400 inches/minute; or 100—130$^{v.}$ when the rate of travel is 1750 inches/minute, or 100—140$^{v.}$ when the rate of travel is 2800 inches/minute. Corresponding current values are substantially 10—25 milliamperes, 15—20 ma., 15—30 ma., 15—30 ma./, and 15—30 ma.. Such performances are for what is known as "Low Resistance Teledeltos, Type L(39)." The foregoing specifications relate to a type of the electrosensitive paper, contemplated to perform and produce the desired recordings herein contemplated; but other forms and examples of such electrosensitive paper may also be used for the intended purposes. It is also to be noted that probably the rate of production of the record would be rather high, since the recording is produced as a line extending parallel to the direction of travel of the slide for a short distance, at the beginning of the expulsion of the slide by the spring 144, when the locking pin 165 has been lowered by the spring 164 of the unit 132. Such electrosensitive papers are disclosed by the following U.S. Pat. Nos.; 2,251,742, issued Aug. 5, 1941; 2,294,146, issued Aug. 25, 1942; 2,294,149, issued Aug. 25, 1942; and 2,528,005, issued Oct. 31, 1950.

Referring next to FIGS. 4, 8, 10, and 11 to 17, the structures and operations above referred to are more fully stated:

FIG. 4, being a bottom view of the slide, looking up, such slide is identified in its entirety by the numeral 141; it is provided with the side edge flanges 142 and 143 which ride in companion grooves of the top of the enclosure. The flange 142 is cut back as shown at 142$^a$. The leaf spring 144 is connected to a pin 145 extending down from the roof or top of the enclosure, in such a manner that the lower end of such spring urges rightwardly (when viewed as in FIG. 4, or leftwardly when viewed as in FIG. 9). The lower end of such spring bears against the end of the cutaway portion of the flange 142$^a$, urging the slide outwardly when released. However, such spring urged outward movement is terminated by engagement of such leaf spring with the stop pin 146 at a point such that outward urge of the slide will terminate when the slide has been driven out far enough to carry the electrosensitive area 146 beyond the stylii (shown by the dots 124, 125 and 126 in FIG. 4), and far enough to carry the conductive area 116 beyond the upstanding contacts, shown by the dots 116 and 117, also in FIG. 4, and far enough to sever such conductive area by the severing means presently to be described. The electrosensitive area is identified by the numeral 147. It is however noted that since the cutaway portion of the flange 142 extends completely to the end of the slide, such slide may be fully withdrawn from the enclosure, even after the spring 144 ceases to engage the slide. Thus the used slide may be removed when a program has been completed, and a fresh slide (unused) may be inserted for producing a recording of the successive program. Such insertion may be freely made to the point at which the spring 144 engages the slide, without hindrence from such spring; and thereafter complete insertion of the slide may be produced, provided the stop pin of the element 131 has been lowered by presence of a control signal on the control line 41, as already explained.

Further reference to FIGS. 9, and 10 to 16 discloses further important features of the relevant structures, as follows:

The electrosensitive area is shown at 147 (FIGS. 9, 10 and 11), the former figures looking down against the top face of the slide, and FIG. 11 looking up against the lower face of the slide, so the electrosensitive area is there shown in full lines. Such area comprises a small sheet of such material as previously referred to, extending across the width of the slide, between the slide flanges. Conveniently such small sheet may comprise an area of which the opposite edges 148 and 149 of the top or nonelectrosensitive surface (FIG. 14), are coated with tacky material, leaving the area of such top surface between such tacky edge portions, uncoated with the tacky material. By this means the electrosensitive area element may be readily attached to the edge portions of the bottom surface area of the slide. When thus attached to the slide it is also necessary to establish electrical connection of the conducting surface of such small sheet, with the proximate area of the slide. Accordingly, there is attached to the bottom surface of the slide between its edge portions (to which the tacky edges of the small sheet will be adhered), a thin sheet of conducting material 150, against when the conducting surface of the electrosensitive sheet, will engage, thus producing means to electrify such conducting surface of the electrosensitive area, during production of a record. Such thin sheet 150 is connected to a narrow strip 151 of conducting material, formed on the outer edge of the slide proximate to the electrosensitive area; and a conductor 152, formed into or through the slide sheet, connects such strip 151 to the conducting material 150.

The leaf spring already referred to is seated within a large recess 153 formed in the under surface of the top of the enclosure, as well shown in FIGS. 4 and 9. A flexible contact leaf 154 is secured to one wall of such recess, with its flexible portion terminating in a contacting end 155 which will engage the strip 151 on the edge of the slide, during a predetermined portion of the slide's endwise movement in either direction. During such engagement of such element 154—155 with the strip 151 on the proximate edge of the slide, electrification of the aluminum surface of the electrosensitive area will be produced, by proper connection of such flexible contact leaf 154 with proper polarity of the source of potential 130. Such connection is produced by the line 156 (FIG. 1), between the bottom terminal of the battery, and the contact element 154. Such connection may take the form of a flexible lead, to enable removal of the top of the enclosure, including the slide and related elements, from the lower or body portion of such enclosure.

When the introduction of the slide into the top portion of the enclosure, is stopped, the electrosensitive area occupies the position shown in FIGS. 1, 2, 4, 8, 9, 15 and 16. At start of the releasing movement such electrosensitive area lies to the right of the stylii, so that just after commencement of the return (releasing) movement of the slide, when released, all three of the stylii engage the electrosensitive area; but only that stylus will be electrified during the early portion of the slide released movement, to produce a discoloration of such electrosensitive area, which corresponds to the station program, "A," "B" or "C," which was received. It is only necessary for a very short interval of engagement of such stylus with the electrosensitive area surface, to produce the discoloration already explained, being of the order of a second or fraction of a second, as already shown by the examples of potential needed vs. rate of travel of the surface. Accordingly, and in order to avoid "burning" of the electrosensitive surface, the delivery of potential to the sheets opposite faces should occur only during slide movement in contact with the electrified stylus. This condition may be produced by making the electrosensitive area dimension less in the direction of movement of the opening slide movement, than the amount of movement during electrification of the stylus, so that the electrosensitive area will override the stylii during the movement of the slide; or the strip 151 of the conducting material along the edge of the slide may be short enough to ensure breaking the circuit prior to stoppage of the slide's movement. This latter solution of the problem may be indicated by the length of the line 157 (FIG. 10), less than the length of slide movement during engagement of the stylus with the electrosensitive surface. The foregoing relationships will be explained hereinafter.

Reference to FIGS. 8 and 15, reveals details of the units 131 and 132, whose operations are under control of the electrification of the control line 41, acting through the line 78. In FIG. 8 the unit 131 includes the solenoid 158 which, when energized, draws down its armature 159, against the urge of the spring 160, thus withdrawing the pin 161 low enough to discontinue interference with the movement of the slide to its fully closed position, and ensuring bridging of the stylii 116 and 117 by the conductor $116^a$ carried by the under face of the slide. On the contrary, the unit 132 includes the solenoid 162 which, when energized, raises its armature 163 against the urge of the spring 164, thus projecting the pin 165 against the under surface of the slide. Accordingly, when the slide is now moved in the complete closing direction, the upper end of such pin 165 will remain in contact with such slide under surface until, just prior to complete entry of the slide to its fully inserted position, such pin will be projected upwardly into the socket 135 formed in the under surface of the slide. In FIG. 16 both of the solenoids 158 and 162 are shown as connected in parallel between the lines 166 and 167. The line 166 connects to the line 78 (FIG. 1), and the line 167 is grounded. Accordingly, the described operations of the units 131 and 132 are produced by the electrification of the control line 41, as explained. It is here noted that such operations of such units 131 and 132 will occur when the control line is electrified in either direction, positively or negatively.

Reference has been made to an operation severing the bridging conductor $116^a$ under certain conditions, thus destroying the usefulness of such slide, so that it cannot be used for another program rendition (other than a broadcast rendition). The means to produce such severing operation are as follows (reference being made to FIGS. 15 and 16):

A unit 168 is set on the floor of the enclosure, close to the unit 131. This unit 168 includes the solenoid 169 which, when energized, draws the armature 171 down against the urge of the spring 170. Such armature carries a bracket within which is journaled a small, sharp edged wheel $171^1$, aligned with the conductor $116^a$, so that when the slide is moved past such wheel, under the condition that the wheel is raised, the wheel will sever such conductor $116^a$, rendering the slide useless for its intended purpose. Such armature 169 is bridged between the lines 166 and 167 (see FIG. 16). Accordingly whenever the control line 41 is electrified, both the units 131 and 168 have their armatures drawn down, thus not only permitting closure of the slide to its full extent, but lowering the cutting wheel sufficiently to avoid severing the conductor $116^a$ during the slide's movement to its full closed position where it will remain locked by the unit 132 as long as potential is retained on the control line 41. Thus the slide remains fully operative to ensure reception of the selected program rendition. Upon completion of such program rendition, followed by removal of the plug 60 from the battery, and deelectrification of the control line 41, both of the units 131 and 168 will be released to spring operation, causing both of them to rise as far as permitted by engagement with the under surface of the slide. At the same time, the unit 132 will be deenergized, allowing its spring to draw down the pin 165 from the opening $135^a$ of the slide, and thus freeing such slide for retrograde or discharge movement. Such discharge movement will be produced by the leaf spring 144, at least as far as permitted by the stop 146. During such retrograde slide movement, both the pin 161 of the unit 131, and the wheel of the unit 168, will ride against the under surface of the slide. Examination of FIG. 15 (and other figures) will show that such retrograde slide movement is sufficient to cause the wheel to completely sever the conductor unit $116^a$. Such operation may be accentuated by provision of a slight depression in the under face of the slide, at the position of such conductor $116^a$, such depression not being shown in the figures due to the slight extent of depth of depression desired.

Due to the various structures and operations thus described, it is seen that under intended operational conditions, the same slide could not be used for delivery of either a superior quality rendition or an inferior quality rendition, more than once. It is, however, evident that by a surrepitious operation the provisions so far described might be circumvented, allowing the user to improperly use the same slide more than one time. An example of such an improper double use of the same slide might be as follows:

Assuming that the currently being rendered (properly) program were nearing its termination. The user might hold the slide against ejection by the spring 144 at termination of a program. This would prevent retrograde movement of the slide, and thus prevent severing of the conductor $116^a$ as long as the slide was thus improperly retained against ejection. However, a slight release of the slide would bring into operation the following provision:

Examination of FIG. 10 will show the "Full Stroke Unit" $170^b$ operatively related to the movements of the slide. Such units are well known and used for many purposes. The illustrated unit includes the following:

One edge of the slide is serrated with many small serrations $171^b$; and the pawl 172 is pivoted to a stationary part (of the top of the enclosure), on the pivot point 173. The leaf spring 174 urges the pawl into its position normal to the direction of slide movement. The pivot point 173 is sufficiently close to the serrated edge of the slide, to prevent return movement of the serrations which have been passed during slide movement. Only when a full stroke in either direction, has been made, can the direction of slide movement be reversed. A short blank space, such as shown at 175 permits reversal of direction of slide movement, at the position of such blank space. By properly proportioning the parts, any retrograde movement from the fully closed position, will cause reversal of the pawl, thus preventing restoration of the slide to its fully closed position. I have earlier referred to the switch 79 (FIG. 1, which, although illustrated away from the path of travel of the slide, is actually located at the end of such path, in the closing direction. Slight retrograde movement of the slide will open such switch, thus disabling the reception of any program, either superior or inferior quality, since such switch opening disables operation of all of the frequency response elements 63, 64 and 65, with corresponding disablement of the relays 70, 71 and 72, killing various controlled elements. Thus a slight retrograde movement of the slide will disable the further program receptions, and the full stroke unit will compel complete removal or discharge of the used slide from the switching facility. Also, a slight retrograde movement of the slide can only be followed by full movement in the retrograde direction, thus ensuring severing of the conductor $116^a$, destroying the slide for any later pay or subscription program delivery.

I refer again to the operations of producing a record of use by production of the marking on the electrosensitive area. It is noted that such marking is produced during the early stage of the discharge of the slide from the enclosure; but it is also noted that the switch 79 (located at the inner or inserted end of the path of the enclosure) opens as soon as the discharge movement of the slide begins. Also, that such switch opening serves to deactivate the relay 70, 71 or 72 which had, during reception of the program, been activated, producing closure of its leaf contact 80 (with suffix). Accordingly, as soon as such relay opens to the degree producing opening of such leaf contact from its corresponding stationary contact 82 (with suffix), the electrification of the corresponding stylus will cease. Accordingly, I provide, for each of such relays 70, 71 and 72 a time-delay element, ensuring a delay in the opening movement of such relay sufficient to ensure that the slide shall have moved far enough in the discharge direction, to produce the desired marking. Various time delay relays are available at the present time, to produce the desired operation.

It is also noted that the unplugging operation produced by the attendant at conclusion of the program, will allow the polar relay to shift back to its central position, with corresponding opening of the leaf contact 104 from the stationary contact 114, thus terminating delivery of marking potential to the line 128, and preventing production of the desired marking. Accordingly, I have provided the capacitor 176 connected between the lines 156 and 128, and the leakage resistor 177 bridged across such capacitor, thus producing a time delay during which sufficient voltage will be retained between the stylus and the aluminum surface of the electrosensitive area, to produce the desired marking. Such time delay interval may be of the order of a second or probably less.

The embodiment thus far described includes two control lines for each subscriber receiver to be served; the line 41 may be termed the quality selector, since the direction of current flow through this line determines the direction in which the polar relay will be shifted from its normal central position. The line 42 may be termed the station program selector, since it is used to carry the control frequencies, one at a time, defining the station program to be rendered. In FIG. 5 I have shown a modified embodiment, in part, of various of the structures already disclosed. The embodiment shown in FIG. 5 is one which requires only a single control line for each served subscriber receiver; this simpler embodiment being made possible by using such control line to carry the quality selector control current, either positive or negative as before; and the program control frequency is then imposed on such selector steady current, with proper arrangements at the control station for thus imposing the control frequencies on the steady quality selector current, and for properly separating the control frequencies from such single control line, by structures included in the switching facility. The control frequency response units 63$^a$, 64$^a$ and 65$^a$ are included in this modified embodiment, performing their already disclosed functions, of activating the relays 70$^a$, 71$^a$ and 72$^a$ (only the solenoids of which relays are shown in FIG. 5), when relays perform the same functions as already explained. The polar relay is included, actuating the polar relay switch through the insulating bar connection, according to the former disclosures. However, modifications of such switching element have been included in this FIG. 5 structure, as explained below:

In the structure of FIG. 1, the polarity of the control frequency line 42 does not change when the polarity of the quality selection line 41 is changed, since the two sets of signals are separate circuit-wise, the line 74 which delivers the control frequencies to the several resonant responsive units, being brought into connection with the line 73 which connects directly to one side of each response unit, by means of the relay 75, which relay is activated by connection of its solenoid to the quality selector control line 41 through the slide actuated switch 79, as already explained. It is noted that the capacitor 77 is included in the short line connecting the stationary contact of the relay 75, to the line 73 to avoid improper grounding of such line 73 when such relay is activated.

But in the modified embodiment of FIG. 5 the reversal of polarity of the single control line, required to reverse the setting of the polar switching unit, would interfere with proper functioning of the resonance responsive units, in the absence of special circuitry to avoid such reversal of polarity of such resonance responsive units. To avoid such improper functioning of the resonant responsive units I have, in FIG. 5 included the following provisions:

The two lines 176$^a$ and 177$^a$ are provided for connection to the two sides of each of the responsive units. These are then brought to contacts of the polar switch unit, in such manner that reversal of the position of such switch reverses the polarity connections of such lines 176 and 177 to the single control line 41$^a$ and the needed ground line connection. Such switch modification includes the following:

The leaf contacts 178 and 179 are added to the switch, and actuated by the insulating bar 106$^a$ as demanded by the polar relay. The contacts 180 and 181 are provided for the tongue 178, and the contacts 182 and 183 are provided for the tongue 179. The lines 176$^a$ and 177$^a$ connect to the two tongues 179 and 178, respectively; the control line 41$^a$ connects to the two outside stationary contacts 180 and 182, and the two inside contacts 181 and 183 both connect to ground. Accordingly, as the polarity of the control line is changed (by plugging in to an opposite end of the battery 61$^a$), the connections of the two lines 176 and 177, to such control line and to ground, are simultaneously reversed by the switch reversal. Thus the polarity effective on the several response elements remains unchanged. This condition will be best explained as follows; Although the polarity of the line 41$^a$ is changed, as far as battery end is concerned, the operational conditions produced at the lines 176 and 177 are not changed relatively to each other. Since the central point of the battery is held at fixed potential by being grounded, and since the two central contacts 181 and 183 are also grounded, it follows that reversal of the switch reverses the ground connection to the response units, by reversal of the side of each response unit which is connected to ground. But reversal of the polarity of the line 41$^a$ means that such line is, under one condition, at potential higher than ground, and under the other condition, lower than ground. Accordingly, flow of current through the response units will always be in the same direction, Under the showing of FIG. 5, the line 177 will always be at higher potential than the line 176, and in each case, the difference of potential between such two lines will always be the same. And in each case, proper reference will be made to the direction of flow of electrons between the plate and the filament of the illustrated three electrode units.

To effectuate the foregoing arrangements, the following modifications have been shown in the control station:

The program selector plug 59$^a$ is connected by the line 184, to the control line 41$^a$, with the capacitor 185 included in such line 184 to prevent improper grounding of the line 41$^a$. Each of the socket plates 56$^a$, 57$^a$ and 58$^a$ is supplied with the corresponding control frequency, by the corresponding oscillator unit legended "$v.+f^a$," "$v.+f^b$," or "$v.+f^c$," as the case may be; such components "$v$" defining a base potential upon which the corresponding frequency "$f^a$," or "$f^b$" or "$f^c$" is imposed. By this structure, selected control frequency for the selected program, is imposed on the selector voltage delivered to the control line 41$^a$, either positive or negative, as the case may be.

Attention is also invited to the switching unit 186 included in the line 177. This switching unit is located at the end of the path of travel of the slide, for closure at complete closing of such slide; thus such switch corresponds to the switch 79 of the embodiment shown in FIG. 1; it being noted, however, that whereas the switch 79 of the FIG. 1 embodiment is included in the line 78 which is, in effect a continuation of the control line 41, and acts to control closing of the relay 75 by which the control frequencies from the control line 42 are delivered to the several response units, the switch 186 of FIG. 5 is included directly in one of the lines 176 and 177 which directly deliver such control frequencies, to the response units.

It is intended that the structures of the slide and related elements, shall provide a record of use of the system for delivery of the various selected pay programs, to the user of the receiver. In this connection it is recalled that the line 128 which delivers "Marker" potential to each of the relay contacts 82 for electrification of the corresponding stylus, is connected to the "Marker" battery only when the polar relay is shifted to its leftward or superior quality rendition, position. Accordingly, any marking produced electro-sensitivity on the sheet of electrosensitive paper 147 represents reception of a pay program, and not a free program, even when such free program is supplied as part of the pay-TV system and operation. It is also intended that the name and subscription number or other identifying indicia of the subscriber, shall be printed or inscribed on one face of each slide, together with the date on which such slide is intended to be used. Also, that periodically, such slides for a succeeding interval, shall be supplied to the identified subscriber, concurrently with such subscriber's return of the slides for the just terminated interval, to the subscription operative's office, for checking against the records kept by the attendant at the control station.

Accordingly, any slide which carries a program use-record (being the discoloration produced by one of the stylii), should also have its conductor area 116[a] severed; otherwise it will be evident that there has been a failure of proper operation of the switching facility. Both the electrosensitive marking and the severed conductor, should appear on a slide, or neither of them should appear. The position of such marking, laterally of the slide will identify the particular program received at the time of use of such slide; and of course provision may be made, both in the number of response units, the number of program identifying frequencies, and other elements, for accommodation of as many different sending station programs, as may be supplied by the pay TV operative.

The signalling from the user of the receiver, to the control station attendant, for various purposes, such as to instruct as to the program desired, and for rendition in either inferior or superior quality, may be produced by any convenient and available means of communication between such receiver subscriber, and the attendant. Such communications may be, for example, by conventional telephone, or by provision of a communication line within the cable which carries the coaxial lines, and the control line or lines. The provision of suitable current needed for power operation of relays and other facilities included in the switching facility, may be complied with by supply from the receiver itself, as indicated by the lines 187 (FIG. 1) and the switch 188, (FIG. 2).

The following operational features of the structures herein disclosed, are pertinent:

The ability to supply a plurality of pay programs to the area of each subscriber, together with the ability of the subscriber to choose that program being available at a given time, for reception by his receiver, in either the inferior or the superior quality rendition, is coordinate to the ability of any conventional receiver to receive the program of his choice from broadcast over-the-air transmission, by the conventional simple tuning operation, and is coordinate with the requirements of the F.C.C. In fact, the tuning of a selected program from a plurality of then available pay TV programs, being on transmission, is as simple as conventional tuning to bring in the selected pay TV program of the user's choice. The presently disclosed equipment must, and does include provisions for assuring that such Pay TV user shall receive that program which he has selected among the several then available for his selection, in either its inferior or its superior quality; and furthermore, the presently disclosed structures ensure that only the selected program (station) (channel), shall be received by such user, as he has caused the structures to deliver to him. His choice is, in the specific embodiments herein disclosed, transmitted by convenient transmission, to the attendant at the control station, and there such attendant performs such simple operations as needed to make the selected program, and no other, available to such user, either in its inferior rendition, or in its superior rendition. The structures herein disclosed, also ensure against a change of the received program being made, by the user (subscriber) without corresponding proper changes in the connections established by the attendant. These provisions enable the attendant to make record of the program selected by the user at a given time, and thus to supply such dependable information as may be required for accurate accountancy. The following comments respecting the structures are proper:

The operation of the attendant in plugging the plug (assigned to the particular subscriber) 59 (or 59[a]), into a selected one of the socket plates 56, 57 or 58 (56[a], 57[a] or 58[a]) assures that the subscriber may receive (as a subscription program, and not broadcast) only the program then being available from the selected sending station. Such assurances is due to the fact that only one of the response units 63, 64 or 65 (63[a], 64[b] or 65[c]) will or can respond to the attendant's plugging operation. Accordingly, only that conductive path 84, 85 or 86, from the response unit's relay, to the corresponding contacts 87, 88 or 89, will be supplied with RF for receiver operation; and will also assure that the RF so supplied will be from that channel which carries the selected program, and from the selected sending station. Such desired selectivity is also extended to the channel tuner of the receiver in question, since, if the user should tune to any nonselected channel (RF channel), the channel for such false tuning would not appear at the contact thus falsely tuned by the subscriber (it being noted that receiver reception and program translation can occur only when both the tuning button 125 of the switching facility, and the tuning element of the receiver, are tuned to that channel and program, as to which the attendant has produced plugging). False setting of either the receiver channel tuning element, or the selector button 135 of the switching facility, will result in complete failure of reception and translation of any program except broadcast programs, by the receiver. Due to this requirement for identity of setting of both the receiver channel selector, and the switching facility channel selector, to the particular station and program which the attendant has plugged, there is assurance that the record of use of the receiver, by the subscriber, will be accurate.

It will nevertheless be evident that, if the subscriber desires to receive the superior quality rendition, he must set the button 137 to the "Superior" position (shown in FIGS. 1, 2 and 3). Accordingly, if the subscriber so desires, he may set such button 137 to the "Inferior" position, and still receive the program which he has selected, and for which the attendant has produced plugging of the plug 59 (or 59[a]). In case of such selection of the inferior quality reception, the present structures include provision whereby the subscriber has evidence that his reception of the program in question, was of the inferior quality rendition, and not the superior quality, thus avoiding being charged the special charge for of the superior quality reception. The provision now referred to will be discussed in connection with further remarks respecting the slide unit. In this connection it is, however to be noted that in case the subscriber should instruct or inform the attendant that he desired the inferior quality rendition, as to which fact the attendant would make entry on his records, the setting of the button 137 to its superior quality rendition position, would of itself cause the fact of superior quality rendition. to be inscribed on the slide, and thus revealed to the accountant's office when such slides afterwards came to the attention of such accountant. The evidence then available, would justify the accountant in correcting his records to show reception of such program, at the date in question, as a superior quality rendition, and therefore subject to the special charge for such program.

The ability of the subscriber to shift the reception of a specified program from the inferior quality to the superior quality reception, is of importance for another reason, as follows:

The subscriber may be uncertain as to which rendition (inferior or superior, incurring a charge), he may desire when a certain program is available. Accordingly he may desire to see a small portion of the beginning of the program, under the inferior quality rendition, before deciding to receive such program in its superior, but charge, rendition, As is evident from study of the disclosures, including FIGS. 1 and 17, the inferior rendition may be secured by shifting the button 137 to its "Inferior" position, but even then two operations must be made before the desired inferior rendition may be secured; namely, the attendant must plug into the battery terminal which will shift the polar relay switch to its inferior quality position, and the subscriber must set the button 137 to the inferior quality position. But a further condition must also be complied with—the slide must also be fully inserted to its fully closed position, thus also locking it in such position by action of the unit 132, as already explained. Such full insertion of the slide will result in locking the slide in such fully inserted position until the attendant may remove the plug from the battery, thus deelectrifying the unit 132. The following alternative operations may be used:

The subscriber may request the attendant to supply the inferior quality reception; compliance by the attendant will cause the polar switch to set to its inferior quality position.

Then, regardless of the position of the button 137, the subscriber may depress the button legended "Test Button" (FIG. 2, 138), thus delivering inferior quality rendition RF to the line 91 for delivery of such RF to that response unit which has been made operative by the attendant's plugging of the plug 59 (or 59$^a$). Such depression of the button 139 serves to bypass or bricge the two stylii contacts 116 and 177, so that it is then unnecessary to fully insert the slide to connect such contacts together. Then the subscriber may watch the rendition of the program in its inferior quality for a short interval, keeping the button 138 depressed. Having thus tested the desirability of receiving such program, the subscriber may notify the attendant that he desires to receive the complete program, in inferior quality rendition or in superior quality rendition, as the case may be. The attendant will then plug the plug 60 (or 60$^a$) according to the subscriber's instructions, for delivery of either the inferior quality or the superior quality rendition.

The following comments respecting the slide and its operations, are pertinent:

First: The marking of the electrosensitive area will occur only when the polar relay has been set to its superior quality reception position. Accordingly, a market produced during the releasing movement of the slide, certainly indicates that the program was received under its superior quality rendition, and is thus a "charge" program.

Second: The position of the marking, laterally of the slide, indicates which one of several programs available for reception, was received and delivered in its superior quality rendition, thus providing a check against records produced by the attendant for the time in question.

Third: The plugging operation produced by the attendant for delivery of either the inferior quality or the superior quality rendition, positively locks the slide in its fully inserted position, so that tampering with such slide is prevented, and the slide may not be removed until the attendant unplugs from the battery.

Fourth: Insertion of the slide by the subscriber, must be complete to the point of closing the switch 79, or 186 (FIG. 5), and withdrawal of the slide cannot occur until such a full insertion has been produced.

Fifth: The attendant is in full control of the quality of reception (either inferior or superior) which will be available, to the subscriber, once such subscriber has instructed the attendant his choice of quality, with compliance with such instruction, by the attendant. Thus, instruction for inferior quality rendition and compliance by the attendant, will forbid reception of the program in its superior quality rendition, even by setting the switch 112 to its superior quality position, after the attendant has complied with the instructions.

Sixth: Reception of the program by the subscriber, can occur only when the selector switch 90 (button 135) is set to the program position instructed to the attendant, and when the switch 112 (button 137) is set to the program quality instructed to the attendant, and when the subscriber has tuned his receiver to the channel position corresponding to the program instructed to the attendant, and to which the switch 90 (135) has been set.

Seventh: Reuse of a slide after it has once been operatively used for reception of a program, is forbidden by the destruction of the connector conductor 116$^a$ at conclusion of rendition of a program.

Eighth: The release of the slide at conclusion of a program, is produced only by the withdrawal of the plug 60 (or 60$^a$) from the battery, by the attendant. Such release, once started, must be continued to completion.

Ninth: Prior to plugging operation by the attendant, the subscriber may, at any time, receive any broadcast program then receivable in the location of the receiver, and without pay or subscription operation. Such reception requires only that the switch 90 (135) shall be set to its position "Ant." as indicated on the top of the switching facility. Reception may then be received from any station available on the air, without charge or prepay, but in the quality under which such broadcast rendition is emitted.

Tenth: Study of the circuitry and facilities herein disclosed, in relationship to the circuitry by which the RF signals of the programs are delivered to the RF input element of the receiver, shows that at no point are the control signals, either for determination of quality of program rendition, or for selection of a specific program from a plurality of programs available at a given time, brought into electrical contact or engagement with such RF program signals; but that at all times the RF program carrying channel signals are passed directly from the coaxial cables to the RF input element of the receiver; thus avoiding improper transfer of control signals to such RF program signals, and ensuring maximum of nondegradation of the program RF signals during their passage through the switching facility.

Eleventh: The subscriber may obtain only the broadcast rendition of any program, without attendant produced operation.

Twelfth: No program rendition (with the exception of a broadcast rendition) may be obtained by the subscriber, without insertion of the slide to its full extent, with the exception of availability of the inferior quality rendition (subscriber rendition) by use of the "Test Button" 139—140, and even such inferior rendition is forbidden unless the attendant has plugged in the proper "Quality Plug" to the inferior quality rendition end of the battery (or other source of DC). Such specialized "Test Button" operation will continue only as long as the subscriber retains the button depressed.

Thirteenth: For purposes of prevention of fraudulent use of the presently disclosed structures, by changing the operational conditions from time to time (e.g., at six month intervals), the control frequencies at which response will occur for the different available programs (channels), may be changed at such intervals, by resetting the capacitors 67$^a$, 67$^b$ and 67$^c$ in simple manner, it being noted that such capacitors are shown in FIGS. 1 and 17 as being adjustable. In this connection, proper provision is made for locking the switching units of the subscriber-receivers, for preventing tampering with the facilities contained in such switching units, access being available only to authorized persons. Such changes or recalibrations may be produced either on the premises of the subscribers, or by "shop" adjustments, substitute switching units being supplied to the subscribers at such intervals.

Fourteenth: Changes may be made in the receiver-switching units from time to time, for substitution of different channels in place of those previously available, by merely substituting different Band-Pass Filters for those previously contained in the circuitry of the switching units, such replacing B.P.F.'s being calibrated for passage of channel frequencies of other channels than originally provided; or adjustments may be made in the calibrations of the B.P.S.'s already installed in such switching units. Such changes in the specifications of the B.P.S.'s do not require any changes in the values of the control frequencies to which the response units respond.

I claim:

1. A subscription or pay television system, comprising in combination (means to supply) means to produce and emit signals for an inferior aesthetic quality rendition of a program, and signals for a superior aesthetic quality rendition of said program for each of a plurality of television programs of different carrier wave channel frequencies, means to supply the inferior aesthetic quality rendition signals for each such program to (each of) a first transmission (line) medium and means to supply the superior aesthetic quality signals for each such program to a second transmission (line) medium, each of which transmission (lines) media extends to a location proximate to a receiver; wherein the (programs) entertainment program components of both said renditions supplied to both of said transmission (lines) media are substantially the same, and wherein the channel frequencies of both renditions of each program are substantially the same (on both such transmission lines); and wherein the program signals on the first transmission (line) medium are translatable to produce a program rendition of inferior aesthetic quality and the program signals on the second transmission (line) medium are translatable to produce a rendition of superior aesthetic quality; together with a receiver constituted to receive and translate the signals of either aesthetic quality for production of a fully intelligible translation of such program, to the viewer or auditor of such receiver translation; together with a receiver control unit proximate to said receiver, and including fourth switching means in connection with both of such transmission (lines) media, and in connection with the radio frequency input element of the receiver, constituted to connect either the first transmission (line) medium or the second transmission (line) medium, to the radio frequency input element of the receiver, selectively, and operator controlled means in connection with said fourth switching means, constituted to cause said switching means to select connection of either the first or the second transmission (line) medium, to the radio frequency input element of the receiver.

2. A subscription or pay television system, as defined in claim 1; wherein the operator controlled means which is in connection with said fourth switch means, comprises remote control means.

3. A subscription or pay television system, as defined in claim 2; wherein the remote control means comprises a control line extending from a control station, to the receiver; connections between said control line and the fourth switch means constituted to cause the switch means to produce connection to either the first transmission medium or the second transmission medium under electrical signals delivered by the control line to such fourth switch means; together with means at the control station constituted to supply to the control line signals of characteristic constituted to cause connection of the ratio input element to a selected transmission medium.

4. A subscription or pay television system as defined in claim 2; wherein the remote control means comprises a control line extending from a control station, to the receiver control unit, and wherein said receiver control unit includes program selector means in connection with the control line and constituted to select one of the plurality of carrier wave frequency programs carried by one of the transmission media, and produce delivery of such carrier wave program to the radio frequency input element of the receiver; together with remote control means in said control station constituted to deliver a program activating signal to the control line, constituted to activate the program selector means for transmission of the selected program carrier wave frequency channel signals, to the radio frequency input element of the receiver.

5. A subscription or pay television system as defined in claim 4; wherein the transmission medium from which one of the plurality of carrier wave frequency programs is selected, comprises the second defined transmission medium.

6. A subscription or pay television system as defined in claim 4; wherein the remote control means which is in connection with the fourth switch means, includes a control line extending from a control station to the receiver control unit, and wherein the control line which is in connection with the program selector means, comprises a control line extending to the same control station.

7. A subscription or pay television system as defined in claim 4; wherein the control line which selects one of a plurality of carrier wave frequency programs comprises a control line separate from the control line which is in connection with the fourth switch means.

8. A subscription or pay television system as defined in claim 4; wherein the control line which selects one of a plurality of carrier wave frequency programs comprises the same control line which is in connection with the fourth switch means.

9. A subscription or pay television system as defined in claim 4; wherein the plurality of programs which are supplied to the transmission media, include a program transmitted to the control station by media which include a comsat transmission and reflection.

10. A subscription or pay television system, comprising in combination; means to supply a plurality of television programs of different carrier wave channel frequencies, to each of a first transmission line and a second transmission line, each of which transmission lines extends to a location proximate to a receiver; together with a receiver constituted to receive and translate the signal received from either such transmission line, with production of a fully intelligible translation and rendition of the program; together with a receiver control unit proximate to said receiver; wherein said receiver control unit includes a first defined program input element in connection with the first transmission line, a second defined program input element in connection with the second defined transmission line; and includes a program signal output element in connection with the radio frequency input element of the receiver; together with a quality-selector switch means, connections between the first defined program input elements, and said quality-selector switch means; wherein said switch means includes means and connections constituted to deliver to a program signal delivery element, the program signals from either of the transmission lines, selectively, under manual control; wherein each transmission line carries and delivers a plurality of radio frequency channel programs, translatable by the receiver, for production of a corresponding plurality of program renditions; wherein the receiver control unit includes a normally inoperative radio frequency channel program selector unit corresponding to each of the program channels carried on the transmission lines, each program selector unit including a program channel frequency input connection, and a program channel delivery connection; means to connect all of the program frequency input connections to a program signals delivery element of the quality-selector switch means; said receiver control unit including a manual program selector switch having input terminals and an output terminal, and manual adjusting means constituted to connect the output terminal with any selected input terminal; and connections between the program delivery elements of the program selector units, and corresponding input terminals of the manual program selector switch, and connections between the output terminal of the manual program selector switch and the radio frequency input element of the receiver; wherein each program selector unit and the connections from its program delivery element to the manual program selector switch, include means constituted to pass the radio frequency channel of the program corresponding to such program selector switch, and to forbid passage of other radio frequency channels; together with means constituted to make operative a selected program selector unit for delivery of the radio frequency channel from the transmission line to the manual program selector switch, which channel corresponds to such program selector unit.

11. A subscription or pay television system as defined in claim 10; wherein the program signal delivery element of the quality-selector switch means, comprises a two position, manually operated selector switch having a selected program signals delivery element; and wherein the program signals delivery element to which the programs signals from either of the transmission lines are delivered, comprises a line connected to the input connection of each of the program channel frequency selector units.

12. A subscription or pay television system as defined in claim 11; wherein the receiver control unit includes a housing; together with a manually shiftable element in connection with the housing, movable between a nonfully inserted position and a fully inserted position, together with spring means urging movement of said element into the nonfully inserted position; wherein the line which is connected to the input connection of each of the program channel frequency selector units, and delivers program signals from either of the transmission lines, includes a gap, and includes spaced apart stationary contacts at the sides of said gap; and wherein the manually shiftable element carries a conductor element constituted to engage both of the stationary contacts when the shiftable element is in its fully inserted position.

13. A subscription or pay television system as defined in claim 12; wherein said shiftable-element-carried-conductor element comprises a severable conductor element; together with receiver control housing supported means, proximate to the shiftable element, and constituted to sever the severable conductor element during movement of the shiftable element from its fully inserted position, to its nonfully inserted position.